(12) United States Patent
Lu

(10) Patent No.: US 6,585,618 B2
(45) Date of Patent: Jul. 1, 2003

(54) REMOTE CONTROL TOY CAR CONTROL SYSTEM

(76) Inventor: Ke-Way Lu, 3F, No. 322, Sec. 6, Min-Chuan E. Rd., Taipei City (TW)

( * ) Notice: Subject to any disclaimer, the term of this patent is extended or adjusted under 35 U.S.C. 154(b) by 102 days.

(21) Appl. No.: 09/939,108

(22) Filed: Aug. 24, 2001

(65) Prior Publication Data

US 2003/0037630 A1 Feb. 27, 2003

(51) Int. Cl.$^7$ .................. F16H 37/08; A63H 30/00
(52) U.S. Cl. .................. 475/206; 74/332; 74/665 K; 74/745; 446/454
(58) Field of Search .................. 475/198, 206; 74/665 S, 665 T, 665 K, 745, 332, 342; 446/454

(56) References Cited

U.S. PATENT DOCUMENTS

| | | | | |
|---|---|---|---|---|
| 1,979,077 A | * | 10/1934 | Pilaar | 74/368 |
| 4,323,354 A | * | 4/1982 | Blanchard | 74/336 R |
| 4,579,544 A | * | 4/1986 | Matsushiro | 446/427 |
| 4,730,505 A | * | 3/1988 | Sumihi | 74/332 |
| 5,135,428 A | * | 8/1992 | Shibayama et al. | 74/337 |
| 5,951,429 A | * | 9/1999 | Eastman | 475/206 |
| 6,413,143 B1 | * | 7/2002 | Lu | 446/454 |
| 6,505,527 B2 | * | 1/2003 | Lu | 74/332 |

* cited by examiner

*Primary Examiner*—Sherry Estremsky
(74) *Attorney, Agent, or Firm*—Ladas & Parry

(57) ABSTRACT

A remote control toy car control system is constructed to include a dual-gearshift transmission mechanism coupled to the engine of the remote control toy car for transmission output power of the engine between a high torque position and a low torque position, a forward backward transmission control mechanism coupled to the output end of the dual-gearshift transmission mechanism for controlling forward/backward movement of the toy car, and a differential assembly coupled to the forward backward transmission control mechanism for enabling the rear wheels of the toy car to turn at different speeds when going round corners.

3 Claims, 10 Drawing Sheets

US 6,585,618 B2

REMOTE CONTROL TOY CAR CONTROL SYSTEM

BACKGROUND OF THE INVENTION

The present invention relates to a remote control toy car and, more particularly, to a remote control toy car control system, which has a dual-gearshift position transmission mechanism, a forward backward transmission control mechanism, and a differential assembly arranged into a system.

Regular gasoline engine remote control toy cars commonly use a transmission mechanism to increase the torque. However, because the transmission mechanism of a conventional gasoline engine remote control toy car provides only one transmission mode, it is less efficient to accelerate the speed, and the torsion cannot be increased during low speed. In order to eliminate these problems, dual-gearshift position transmission mechanisms are developed. However, prior art dual-gearshift position transmission mechanisms are commonly heavy, complicated, and expensive. Furthermore, the parts of the prior art high-precision dual-gearshift position transmission mechanisms wear quickly with use.

Further, regular gasoline engine remote control toy cars can be controlled to move forwards as well as backwards. However, the forward transmission and the backward transmission are controlled by two separated systems, i.e., when moving the toy car forwards, the user must start the forward transmission system to drive the toy car forwards; when moving the toy car backwards, the user must stop the forward transmission system and then start the backward transmission system. This forward backward transmission design is complicated, consumes much gasoline, and requires much installation space.

Like real cars, the wheels at the inner side and the wheels at the outer side have different speed of revolution when going round corners. In order to balance the speed between the wheels at the inner side and the wheels at the outer side when going round corners, a speed differential assembly shall be installed. However, because the forward transmission mechanism, the backward transmission mechanism, and the differential assembly are separated mechanisms, they cannot be installed in a common housing. Therefore, prior art gasoline remote control toy cars are commonly heavy and expensive.

SUMMARY OF THE INVENTION

The present invention has been accomplished to provide a remote control toy car control system, which eliminates the aforesaid drawbacks. It is one object of the present invention to provide a remote control toy car control system, which has a dual-gearshift position transmission mechanism, a forward backward transmission control mechanism, and a differential assembly arranged into a system. It is another object of the present invention to provide a remote control toy car control system, which achieves the advantages of high/low dual-gearshift position automatic shifting control, easy forward/backward steering control, impact structure, high economic effect, high performance, and stable functioning. To achieve these and other objects of the present invention, the remote control toy car control system comprises a dual-gearshift position transmission mechanism, a forward backward transmission control mechanism, and a differential assembly. The dual-gearshift position transmission mechanism comprises a first drive gear and a second drive gear fixedly mounted on the output shaft of the engine of the remote control toy car; a first driven gear meshed with the first drive gear; a second driven gear meshed with the second drive gear, the gear ratio between the first second drive gear and the second driven gear being smaller than the gear ratio between the first drive gear and the first driven gear; a transmission tube connected in series to the first driven gear and the second driven gear; a one-way axle bearing mounted between the transmission tube and the first driven gear; and a clutch fixedly mounted on the transmission tube and coupled to the second driven gear. The forward backward transmission control mechanism comprises a first gear fixedly mounted on the transmission tube of the dual-gearshift position transmission mechanism, the first gear comprising external teeth arranged around the outer diameter thereof and internal teeth arranged around the inner diameter thereof; a second gear, the second gear comprising internal teeth arranged around the inner diameter thereof and external teeth arranged around the outer diameter thereof; a movable gear adapted to be moved between a first position where the movable gear is meshed with the internal teeth of the first gear, and a second position where the movable gear is meshed with the internal teeth of the second gear; a first idle gear wheel meshed with the external teeth of the first gear; and a second idle gear wheel meshed with the first idle gear wheel and the external teeth of the second gear. The differential assembly comprises a shell; a hollow polygonal shaft mounted in the shell and inserted through the movable gear of the forward backward transmission control mechanism for enabling the movable gear to be moved axially along the polygonal shaft; a first center axle axially inserted through the hollow polygonal shaft and the transmission tube for free rotation relative to the hollow polygonal shaft and the transmission tube; a first center axle gear fixedly mounted on the first center axle; a second center axle axially coupled to the first center axle for enabling the second center axle and the first center axle to be separately rotated; a second center axle gear fixedly mounted on the second center axle; a plurality of first planet gears mounted in the shell and respectively meshed with the second center axle gear; and a plurality of second planet gears mounted in the shell and respectively meshed with the first center axle gear.

DETAILED DESCRIPTION OF THE PREFERRED EMBODIMENT

Figure 1:
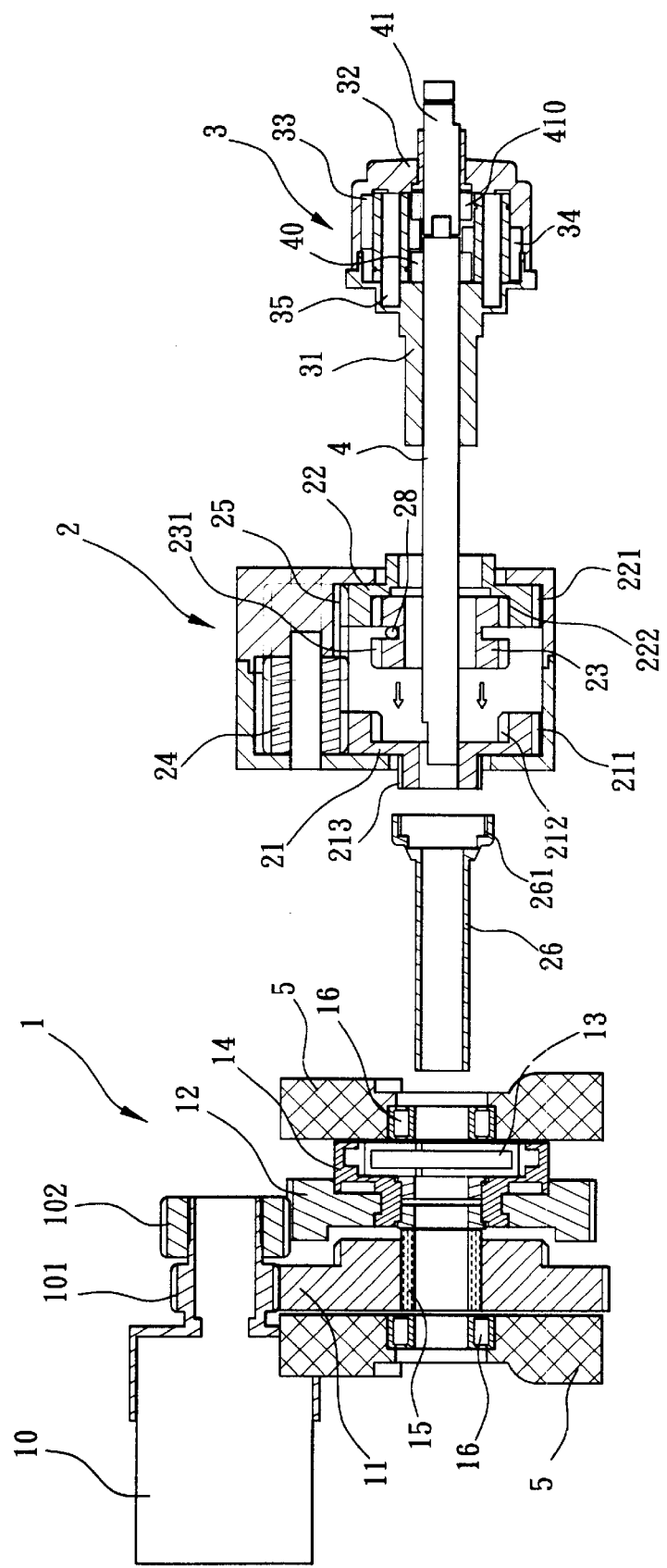
FIG. 1 is an exploded, sectional plain view of a remote control toy car control system according to the present invention.
Figure 2:
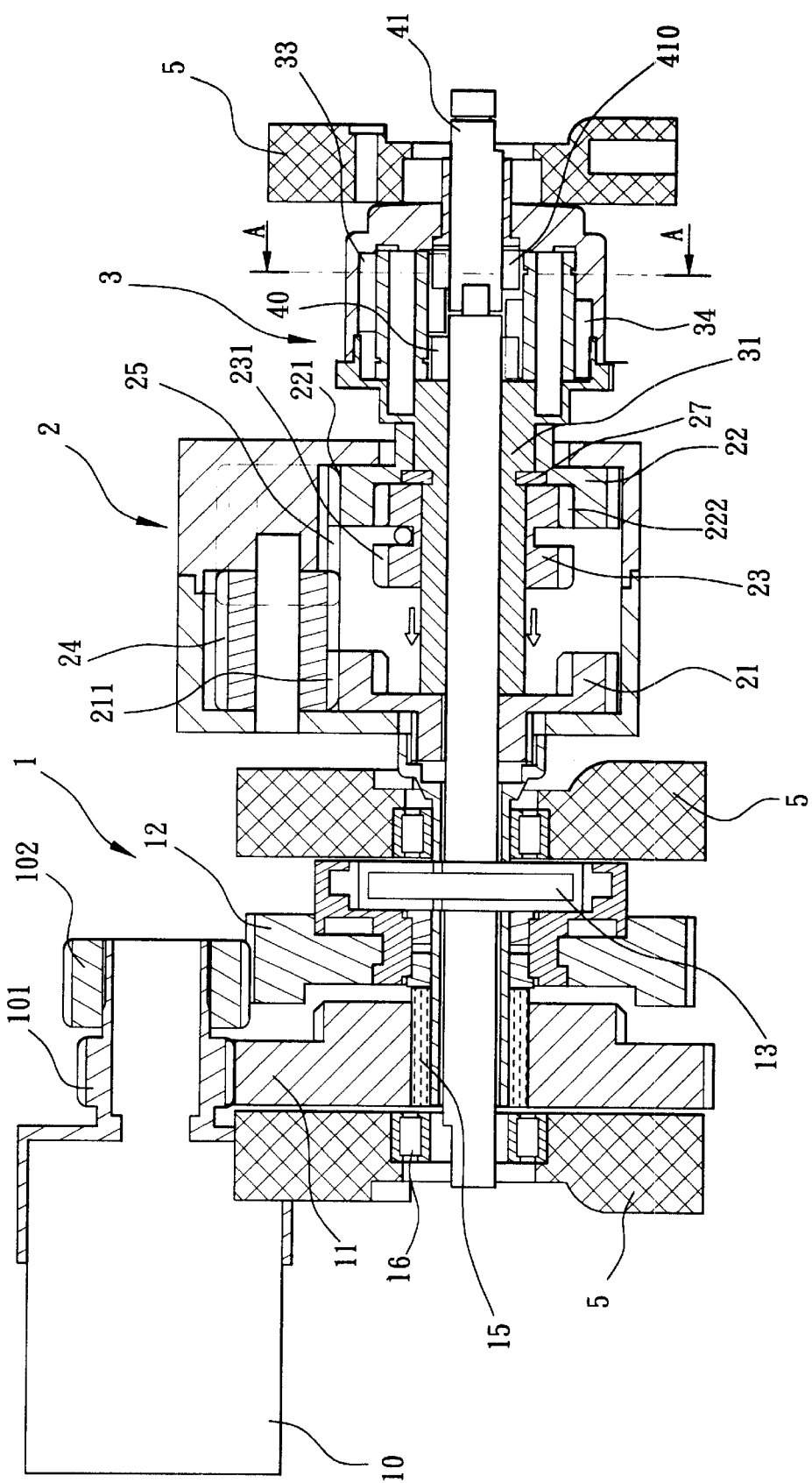
FIG. 2 is a sectional assembly view of the remote control toy car control system according to the present invention.
Figure 10:
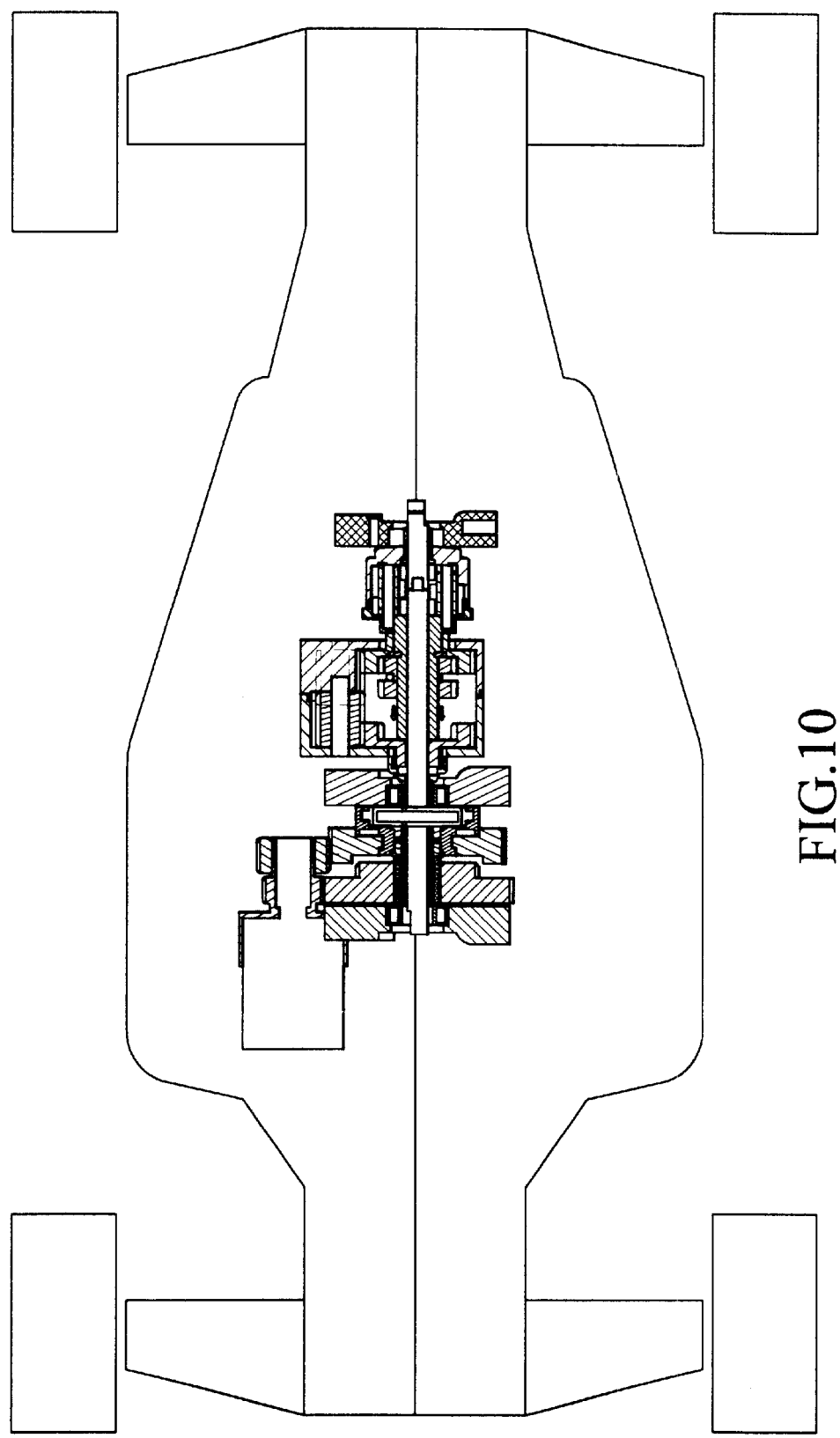
FIG. 10 is a schematic drawing showing the remote control toy car control system of the present invention installed in the remote control toy car.

Referring to FIGS. 1, 2, and 10, a remote control toy car control system in accordance with the present invention is generally comprised of a dual-gearshift position transmission mechanism 1, a forward backward transmission control mechanism 2, and a differential assembly 3. The dual-gearshift position transmission mechanism 1, the forward backward control mechanism 2, and the differential assembly 3 are arranged together and mounted on holders 5 (see FIG. 2). The positioning of the control system in the frame structure of the toy car is as shown in FIG. 10.

Referring to FIGS. 1 and 2 again, the dual-gearshift position transmission mechanism 1 comprises a first drive gear 101 and a second drive gear 102 connected to the engine 10, a first driven gear 11, a second driven gear 12, a clutch 13, a sleeve 14, and a one-way axle bearing 15. The first drive gear 101 and the second drive gear 102 are fixedly mounted on the output shaft of the engine 10. The first drive gear 101 has a diameter smaller than the second drive gear 102. The one-way axle bearing 15 is mounted in the center hole of the first driven gear 11. The sleeve 14 is mounted in the center hole of the second driven gear 12. The first driven gear 11 and the second driven gear 12 are arranged in parallel between two holders 5 and respectively meshed with the first drive gear 101 and the second drive gear 102. The gear ratio between the first driven gear 11 and the first drive gear 101 is 5:1. The gear ratio between the second driven gear 12 and the second drive gear 102 is 3:1. The two holders 5 have the respective center hole mounted with a respective two-way axle bearing 16. Further, a transmission tube 26 is inserted through the two-way axle bearings 16 in the two holders 5, the clutch 13 and the one-way axle bearing 15, and fixedly secured thereto. The transmission tube 26 has an inner thread 261 at one end.

When starting the engine 10, the first drive gear 101 and the second drive gear 102 are synchronously rotated with the output shaft of the engine 10, and drive the first driven gear 11 and the second driven gear 12 to rotate synchronously. Because the gear ratio between the first drive gear 101 and the first driven gear 11 is greater than the gear ratio between the second drive gear 102 and the second driven gear 12 and because the clutch 13 is disengaged from the sleeve 14 at the initial stage after started the engine 10, the second driven gear 12 is rotated at a relatively higher speed than the first driven gear 11. However, because the sleeve 14 is disengaged from the clutch 13, it runs idle. Therefore, at the initial stage after started the engine 10, the first drive gear 101 drives the first driven gear 11 to rotate at a low speed, and the first driven gear 11 drives the one-way axle bearing 15 to rotate the transmission tube 26 at a low speed. When rotating the transmission tube 26, the clutch 13 is rotated with the transmission tube 26. When accelerating the engine 10, the revolving speed of the transmission tube 26 is increased. When the revolving speed of the transmission tube 26 reached the set value, the internal stop member (not shown) of the clutch 13 is forced outwards by the centrifugal force into engagement with the coupling element (not shown) of the sleeve 14, thereby causing the second drive gear 102 to rotate the second driven gear 12 at a high speed, and therefore the transmission tube 26 is rotated at a high speed. Further, when the speed of the engine 10 dropped below the set value, the internal stop member of the clutch 13 is disengaged from the sleeve 14, and the output power of the engine 10 is transmitted through the first drive gear 101, the first driven gear 1 and the one-way axle bearing 15 to the transmission tube 26 to reduce the revolving speed of the transmission tube 26, enabling the transmission tube 26 to provide a relatively higher torsional force. Thus, the dual-gearshift position transmission mechanism achieves dual-gearshift position switching automatically.

Figure 4:
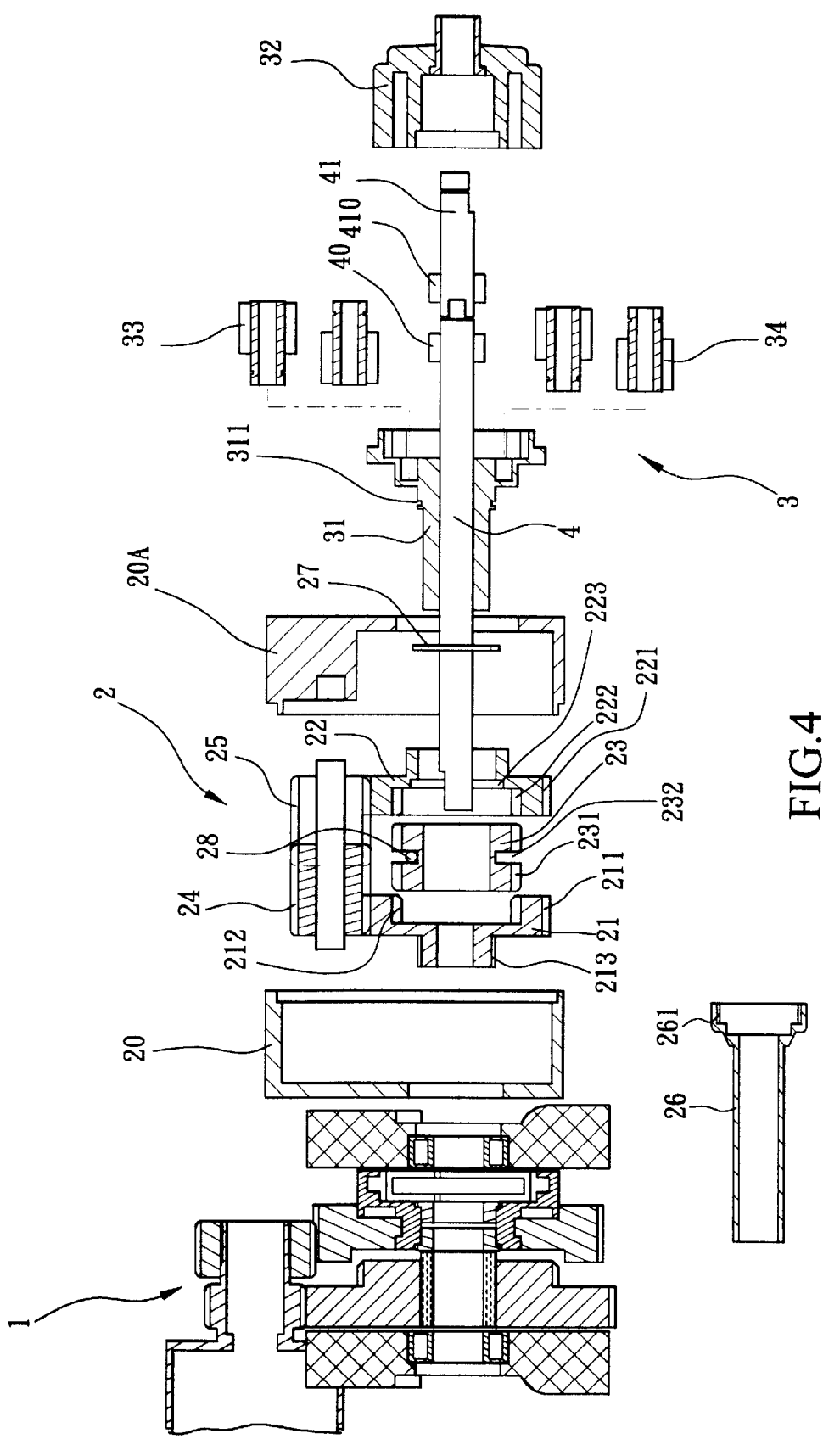
FIG. 4 is another exploded, sectional plain view of the remote control toy car control system according to the present invention.

Referring to FIG. 4, the forward backward transmission control mechanism is comprised of a case formed of a first shell 20 and a second shell 20A, a first gear 21, a second gear 22, a movable gear 23, a first idle gear wheel 24, and a second idle gear wheel 25. The first gear 21, the second gear 22, the movable gear 23, the first idle gear wheel 24, and the second idle gear wheel 25 are mounted inside the case of the first shell 20 and the second shell 20A.

Figure 5:
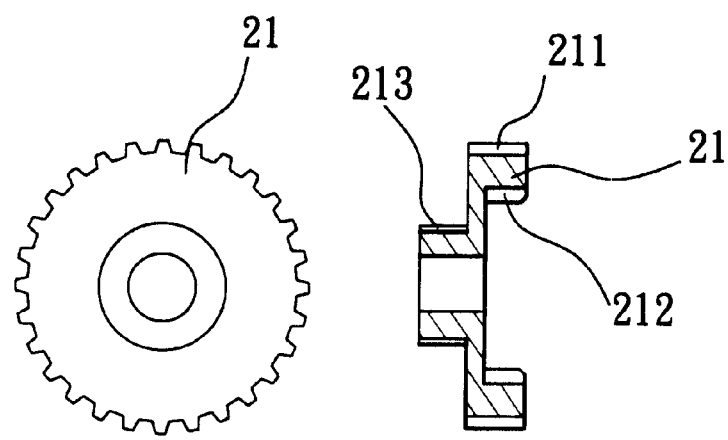
FIG. 5 is front and side sectional views of the first gear of the forward backward transmission control mechanism according to the present invention.

As shown in FIG. 5, the first gear 21 has a threaded gear shaft 213 threaded into the inner thread 261 of the transmission sleeve 26, external teeth 211 arranged around the outer diameter, and internal teeth 212 arranged around the inner diameter.

Figure 6:
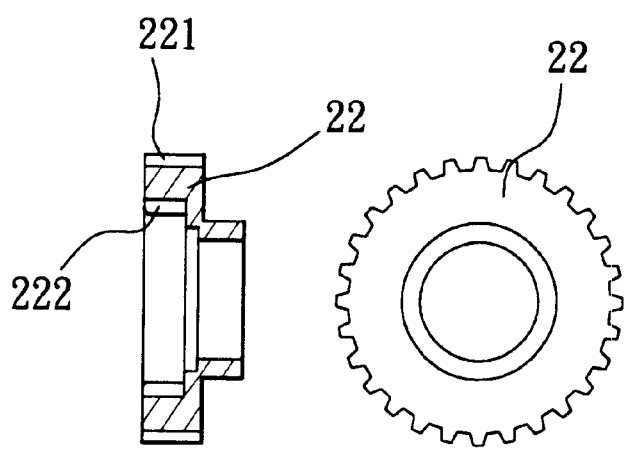
FIG. 6 is front and side sectional views of the second gear of the forward backward transmission control mechanism according to the present invention.

As shown in FIG. 6, the second gear 22 has external teeth 221 arranged around the outer diameter, and internal teeth 222 arranged around the inner diameter.

Figure 7:
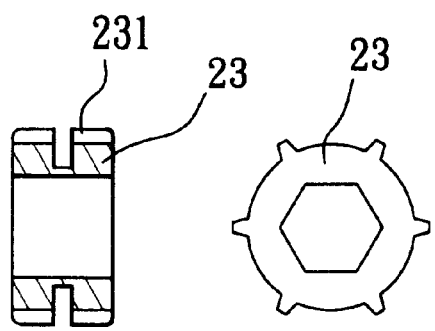
FIG. 7 is front and side sectional views of the movable gear of the forward backward transmission control mechanism according to the present invention.
Figure 8:
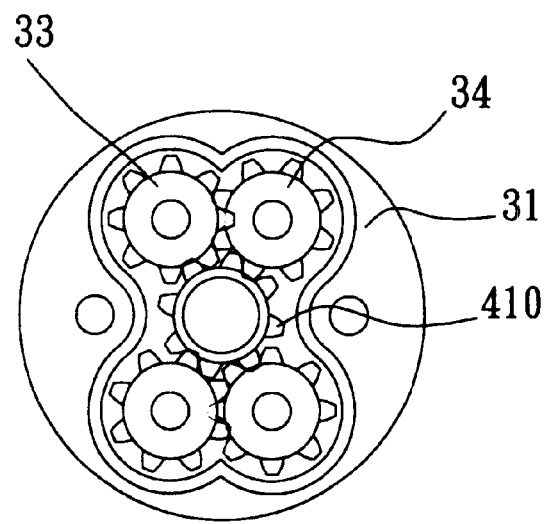
FIG. 8 is a sectional plain view of the differential assembly of the present invention, showing the relationship between the second center axle gear and the first and second planet gears.

As shown in FIG. 7, the movable gear 23 has an annular groove 232 around the periphery, a lever 28 fastened to the annular groove 232, and external teeth 231 around the periphery. The movable gear 23 further has a polygonal center through hole coupled to the polygonal shaft 31 of the differential assembly 3 such that the movable gear 23 can be moved axially along the polygonal shaft 31 of the differential assembly 3 but is prohibited from rotary motion relative to the polygonal shaft 31 of the differential assembly 3. The lever 28 is coupled to a server through a linkage (not shown). The user can operate the remote controller to move the lever 28, causing the movable gear 23 to be shifted axially along the polygonal shaft 31 of the differential assembly 3, so as to force the external teeth 231 of the movable gear 23 into engagement with the internal gear 212 of the first gear 21 or the internal gear 222 of the second gear 22.

As illustrated in FIG. 4, the first idle gear wheel 24 and the second idle gear wheel 25 are supported on a respective shaft between the first shell 20 and the second shell 20A and meshed together for free rotation. The first idle gear wheel 24 is also meshed with the external teeth 211 of the first gear 21. The second idle gear wheel 25 is also meshed with the external teeth 221 of the second gear 22.

Figure 3:
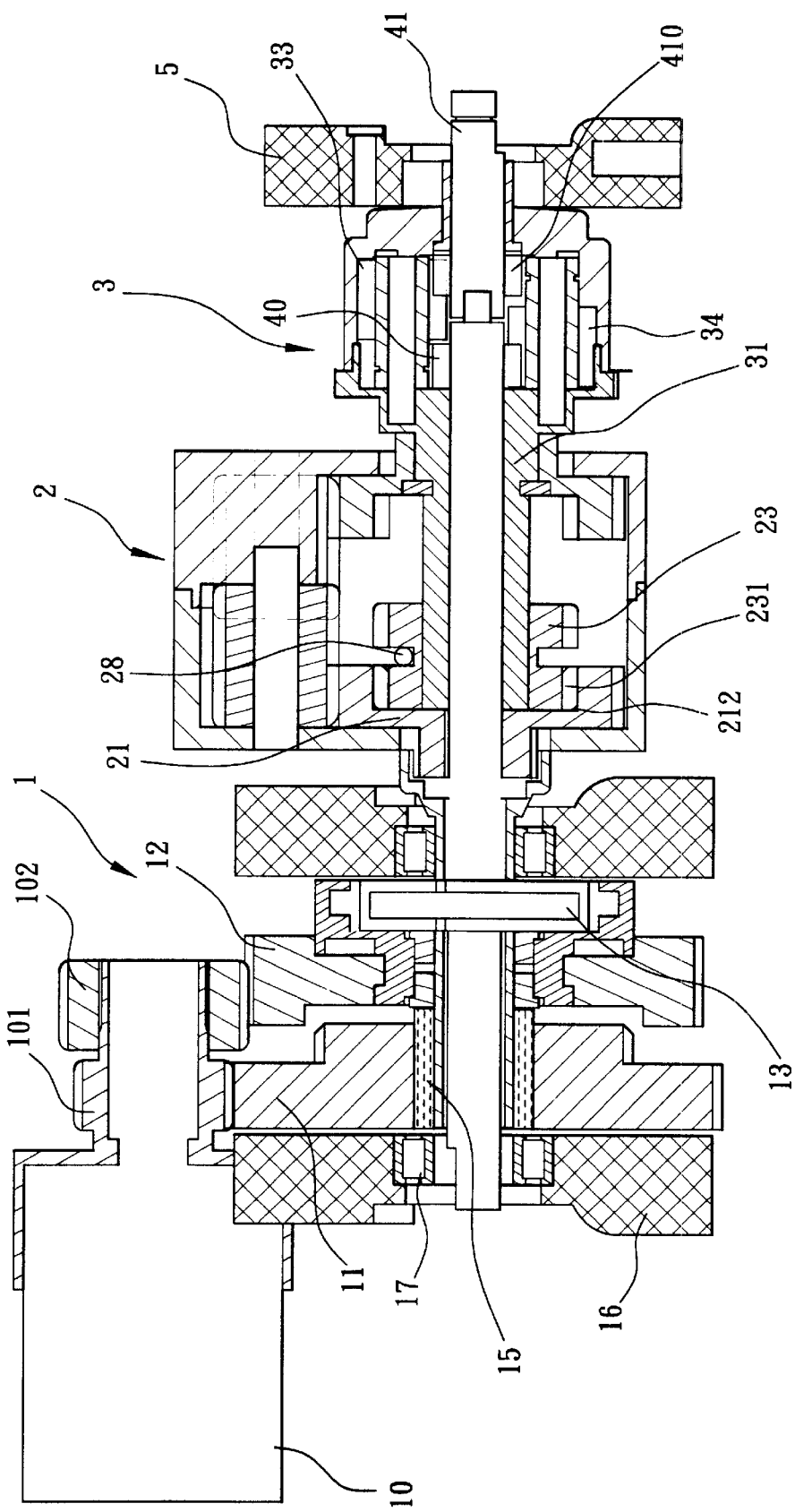
FIG. 3 is similar to FIG. 2 but showing the movable gear moved into engagement with the first gear of the forward backward transmission control mechanism according to the present invention.

Referring to FIGS. 1, 2, and 4 again, when the user drive the server and to move the movable gear 23 along the polygonal shaft 31 to the position shown in FIG. 2, the output power of the engine 10 is transmitted through the dual-gearshift position transmission mechanism 1 and the transmission tube 26 to the first gear 21, causing the first gear 21 to be rotated clockwise. During clockwise rotation of the first gear 21, the first idle gear wheel 24 and the second idle gear wheel 25 are driven to rotate the second gear 22 counter-clockwise. Because the internal teeth 222 of the second gear 22 are meshed with the movable gear 23. The movable gear 23 is rotated with the second gear 22 counter-clockwise, thereby causing the polygonal shaft 31 of the differential assembly 3 to be rotated counter-clockwise. On the contrary, when moving the movable gear 23 to the position shown in FIG. 3, the external teeth 231 of the movable gear 23 are disengaged from the internal teeth 222 of the second gear 22 and meshed with the internal teeth 212 of the first gear 21. At this time, clockwise rotation of the first gear 21 drives the movable gear 23 to rotate clockwise, thereby causing the polygonal shaft 31 of the differential assembly 3 to be rotated with the movable gear 23 clockwise.

Referring to FIG. 7 and FIGS. 1, 2 and 4 again, the differential assembly 3, except the aforesaid polygonal shaft 31, further comprises a first center axle 4, a second center axle 41, a plurality of first planet gears 33, and a plurality of second planet gears 34. The first center axle 4 and the second center axle 41 are axially coupled together, and can be rotated relative to each other. The polygonal shaft 31 is a tubular shaft of polygonal cross section, having an annular groove 311 around the periphery. After insertion of the polygonal shaft 31 through the center hole of the second gear 22 and the center hole of the movable gear 23, a C-shaped clamp 27 is fastened to the annular groove 311 to secure the second gear 22 to the polygonal shaft 31, enabling the movable gear 23 to be moved between the first gear 21 and the second gear 22. The first center axle 4 is inserted through the polygonal shaft 31 and the transmission tube 26, and can be rotated relative to the polygonal shaft 31 and the transmission tube 26. The first center axle 4 and the second center axle 41 are respectively connected to different output systems. A first center axle gear 40 and a second center axle gear 410 are respectively fixedly mounted on the first center axle 4 and the second center axle 41. The first planet gears 33 and the second planet gears 34 are mounted in a cover shell 32 in reversed directions. The first planet gears 33 are meshed with the second center axle gear 410. The second planet gears 34 are meshed with the first center axle gear 40.

When controlling the forward backward transmission control mechanism 2 to rotate the polygonal shaft 31 of the differential assembly 3, the first planet gears 33 and the second planet gears 34 are turned around the second center axle gear 410 and the first center axle gear 41, thereby causing the first center axle gear 40 and the second center axle gear 410 to rotate the first center axle 4 and the second center axle 41, and therefore the first center axle 4 and the second center axle 41 synchronously give an output. At the same time, the first center axle gear 41 and the second center axle gear 410 are rotated on the respective axis, causing the first center axle 4 and the second center axle 41 to produce a speed difference.

The main feature of the present invention is to arrange the dual-gearshift position transmission mechanism 1, the forward backward transmission control mechanism 2, and the differential assembly 3 together, so that the remote control toy car has the advantages of high/low dual-gearshift position automatic shifting control, easy forward/backward steering control, impact structure, high economic effect, high performance, stable functioning, and etc.

Figure 9:
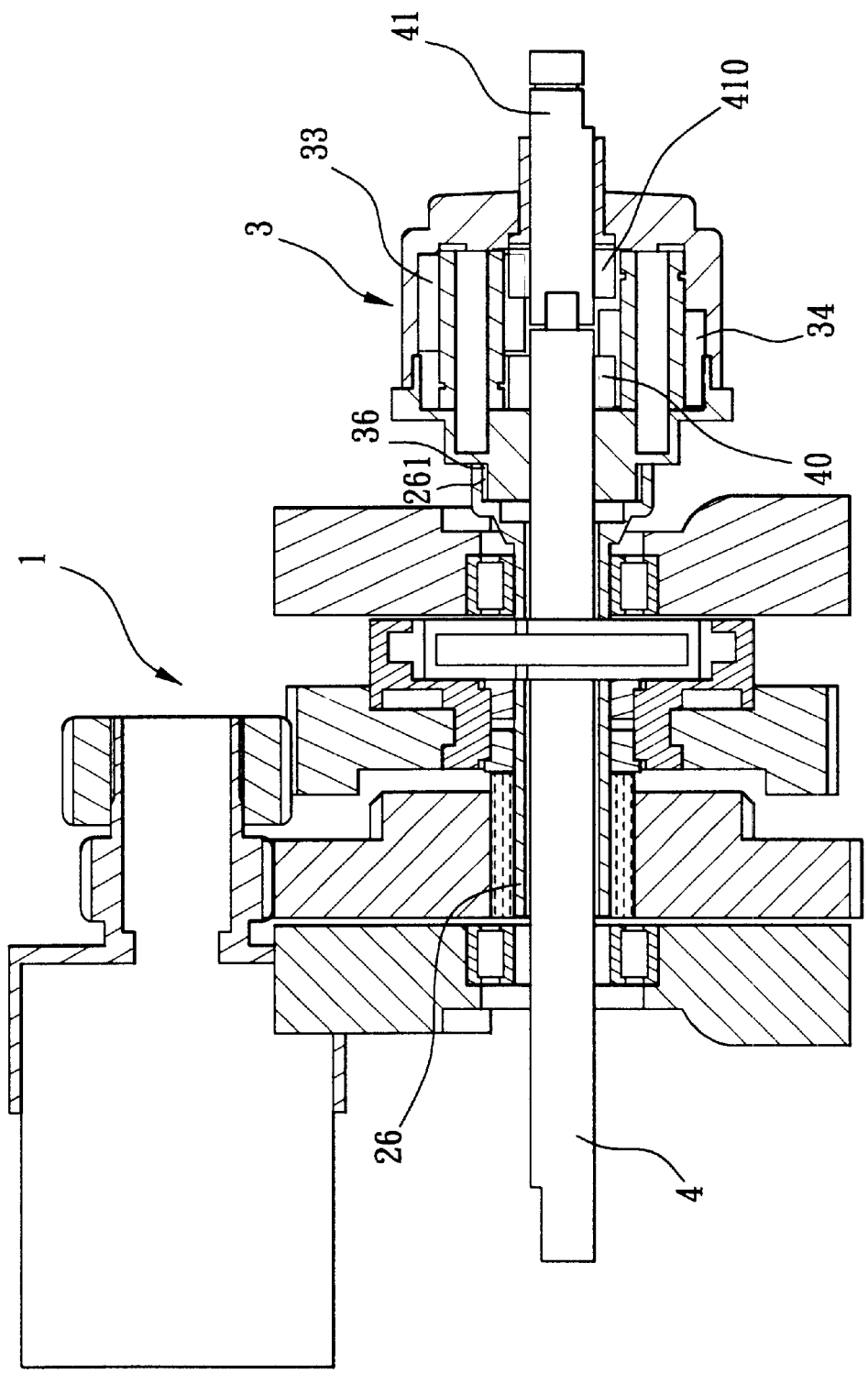
FIG. 9 is a sectional plain view of the present invention showing the connection between the dual-gearshift position transmission mechanism and the differential assembly.

FIG. 9 shows an alternate form of the present invention. According to this alternate form, the remote control toy car control system eliminates the aforesaid forward backward transmission control mechanism 2, and directly couples the dual-gearshift position transmission mechanism 1 to the differential assembly 3. As illustrated, the outer shell of the differential assembly 3 has an outer thread 36 threaded into the inner thread 261 of the transmission tube 26. The transmission tube 26 is coupled to the dual-gearshift position transmission mechanism 1 in the same manner as the aforesaid first embodiment. By means of this arrangement, the output power of the dual-gearshift position transmission mechanism 1 is transmitted through the transmission tube 26 to the differential assembly 3, causing the outer shell of the differential assembly 3 to be rotated with the transmission tube 26. When rotating the differential assembly 3, the planet gears 34 and 33 drive the first center axle gear 40 and the second center axle gear 410 to rotate, thereby causing the first center axle 4 and the second center axle 41 to provide a respective rotary output power differentially.

Figure 11:
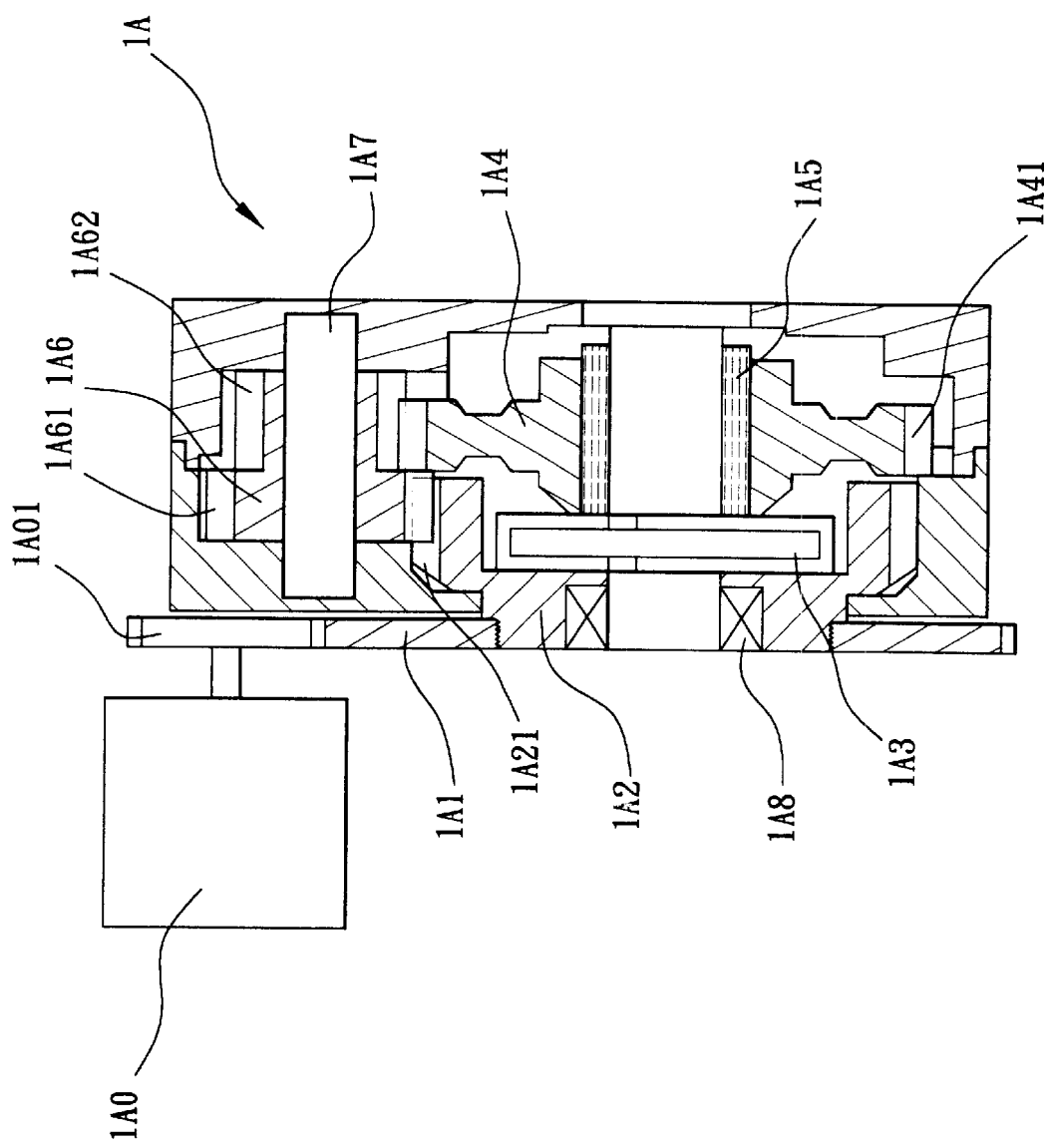
FIG. 11 is a sectional plain view of an alternate form of the dual-gearshift position transmission mechanism according to the present invention.

FIG. 11 shows another alternate form of the present invention. According to this alternate form, the remote control toy car control system is comprised of a dual-gearshift position transmission mechanism 1A, a forward backward transmission control mechanism 2, and a differential assembly 3. The forward backward transmission control mechanism 2 and the differential assembly 3 are same as that of the embodiment shown in FIG. 1. According to this embodiment, the dual-gearshift position transmission mechanism 1A comprises a drive gear 1A01 coupled to the engine 1A0, a driven gear 1A1, a first transmission gear 1A2, a clutch 1A3, a second transmission gear 1A4, an idle gear wheel 1A6, and a one-way axle bearing 1A5.

The first transmission gear 1A2 comprises a protruded block (not shown) suspended in the recessed front side thereof, a series of teeth 1A211 disposed around the periphery, and a two-way axle bearing 1A8 mounted in the center through hole thereof. The second transmission gear 1A4 comprises a series of teeth 1A41 disposed around the periphery and a one-way axle bearing 1A5 mounted in the center through hole thereof. The transmission tube 26 is inserted through the one-way axle bearing 1A5, the clutch 1A3, and the two-way axle bearing 1A8, keeping the transmission tube 26 secured to the one-way axle bearing 1A5, the clutch 1A3 and the two-way axle bearing 1A8. The idle gear wheel 1A6 has a big gear 1A61 and a small gear 1A62 mounted thereon. A gear shaft 1A7 is inserted through the axial center through hole of the idle gear wheel 1A6 and connected between two opposite sidewalls of the outer shell of the dual-gearshift position transmission mechanism 1A, keeping the big gear 1A61 meshed with the teeth 1A21 of the first transmission gear 1A2 and the small gear 1A62 meshed with the teeth 1A41 of the second transmission gear 1A4. After installed in the outer shell of the dual-gearshift position transmission mechanism 1A, the first transmission gear 1A2 has a part extended out of the outer shell of the dual-gearshift position transmission mechanism 1A and fixedly connected to the driven gear 1A1, which is meshed with the drive gear 1A01.

Figure 12:
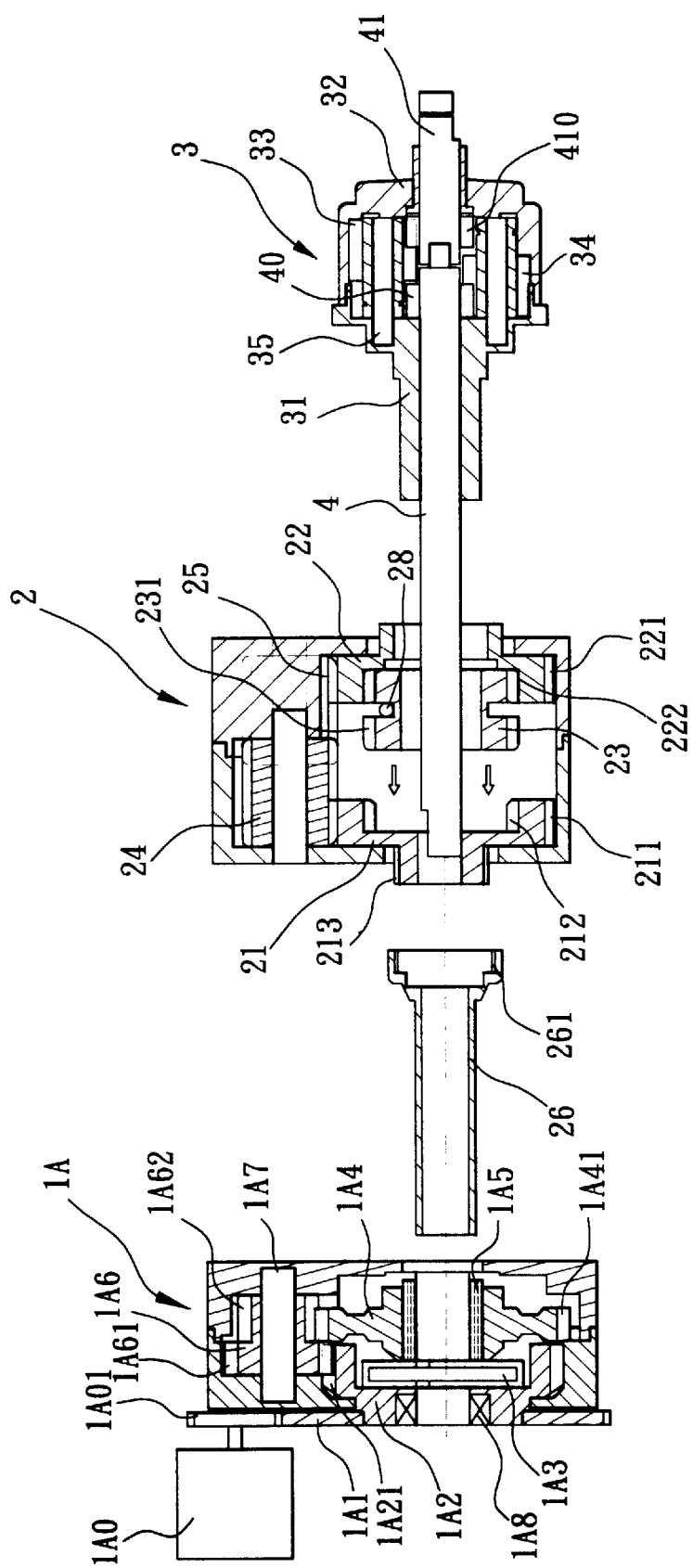
FIG. 12 is an exploded, sectional plain view of an alternate form of the remote control toy car control system according to the present invention.

Referring to FIG. 12 and FIG. 11 again, when starting the engine 1A0, the drive gear 1A01 drives the driven gear 1A1 and the first transmission gear 1A2 to rotate, thereby causing the idle gear wheel 1A6 to rotate the second transmission gear 1A4. By means of the effect of the one-way axle bearing 1A5, the transmission tube 26 is rotated with the second transmission gear 1A4 at a low speed at this time. During rotary motion of the transmission tube 26, the clutch 1A3 is rotated with the transmission tube 26 synchronously. When the speed of the engine 1A0 surpasses a predetermined level after starting, the centrifugal force produced from the rotary motion of the clutch 1A3 forces the movable stop element (not shown) of the clutch 1A3 outwards into engagement with the protruded block of the first transmission gear 1A2, for enabling the driving power of the engine 1A0 to be transmitted through the driven gear 1A1 and the first transmission gear 1A2 to the transmission tube 26 to accelerate the speed of revolution of the transmission tube 26. On the contrary, when the speed of the engine 1A0 drops below the predetermined level, the stop member of the clutch 1A3 is returned and disengaged from the first transmission gear 1A2, enabling the driving power of the engine 1A0 to be transmitted through the first transmission gear 1A2, the idle gear wheel 1A6 and the second transmission gear 1A4 to the transmission tube 26, and therefore the transmission tube 26 is rotated at a low speed to provide a high torsional output.

A prototype of remote control toy car control system has been constructed with the features of FIGS. 1~12. The remote control toy car control system functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A remote control toy car control system installed in a remote control toy car and coupled to the engine of the remote control toy car for controlling the operation of the remote control toy car by a remote controller, comprising:
   a dual-gearshift position transmission mechanism, said dual-gearshift position transmission mechanism comprising:
      a first drive gear and a second drive gear fixedly mounted on the output shaft of the engine of the remote control toy car;
      a first driven gear meshed with said first drive gear;
      a second driven gear meshed with said second drive gear, the gear ratio between said first second drive gear and said second driven gear being smaller than the gear ratio between said first drive gear and said first driven gear;
      a transmission tube connected in series to said first driven gear and said second driven gear;
      a one-way axle bearing mounted between said transmission tube and said first driven gear; and
      a clutch fixedly mounted on said transmission tube and coupled to said second driven gear;
   a forward backward transmission control mechanism, said forward backward transmission control mechanism comprising:
      a first gear fixedly mounted on the transmission tube of said dual-gearshift position transmission mechanism, said first gear comprising external teeth arranged around the outer diameter thereof and internal teeth arranged around the inner diameter thereof;
      a second gear, said second gear comprising internal teeth arranged around the inner diameter thereof and external teeth arranged around the outer diameter thereof;
      a movable gear adapted to be moved between a first position where said movable gear is meshed with the internal teeth of said first gear, and a second position where said movable gear is meshed with the internal teeth of said second gear;
      a first idle gear wheel meshed with the external teeth of said first gear; and
      a second idle gear wheel meshed with said first idle gear wheel and the external teeth of said second gear; and
   a differential assembly, said differential assembly comprising:
      a shell;
      a hollow polygonal shaft mounted in said shell and inserted through said movable gear of said forward backward transmission control mechanism for enabling said movable gear to be moved axially along said polygonal shaft;
      a first center axle axially inserted through said hollow polygonal shaft and said transmission tube for free rotation relative to said hollow polygonal shaft and said transmission tube;
      a first center axle gear fixedly mounted on said first center axle;
      a second center axle axially coupled to said first center axle for enabling said second center axle and said first center axle to be separately rotated;
      a second center axle gear fixedly mounted on said second center axle;
      a plurality of first planet gears mounted in said shell and respectively meshed with said second center axle gear; and
      a plurality of second planet gears mounted in said shell and respectively meshed with said first center axle gear.

2. A remote control toy car control system installed in a remote control toy car and coupled to the engine of the remote control toy car for controlling the operation of the remote control toy car by a remote controller, comprising:
   a dual-gearshift position transmission mechanism, said dual-gearshift position transmission mechanism comprising:
      a first drive gear and a second drive gear fixedly mounted on the output shaft of the engine of the remote control toy car;
      a first driven gear meshed with said first drive gear;
      a second driven gear meshed with said second drive gear, the gear ratio between said first second drive gear and said second driven gear being smaller than the gear ratio between said first drive gear and said first driven gear;
      a transmission tube connected in series to said first driven gear and said second driven gear;
      a one-way axle bearing mounted between said transmission tube and said first driven gear; and
      a clutch fixedly mounted on said transmission tube and coupled to said second driven gear; and
   a differential assembly, said differential assembly comprising:
      a shell fixedly fastened to said transmission tube;
      a first center axle axially inserted through said transmission tube for free rotation relative to said transmission tube;
      a first center axle gear fixedly mounted on said first center axle;
      a second center axle axially coupled to said first center axle for enabling said second center axle and said first center axle to be separately rotated;
      a second center axle gear fixedly mounted on said second center axle;
      a plurality of first planet gears mounted in said shell and respectively meshed with said second center axle gear; and
      a plurality of second planet gears mounted in said shell and respectively meshed with said first center axle gear.

3. A remote control toy car control system installed in a remote control toy car and coupled to the engine of the remote control toy car for controlling the operation of the remote control toy car by a remote controller, comprising:

a first transmission gear;

a second transmission gear;

a transmission tube connected to said first transmission gear and said second transmission gear;

a two-way axle bearing mounted between said first transmission gear and said transmission tube and fixedly fastened to said transmission tube;

a one-way axle bearing mounted between said second transmission gear and said transmission tube and fixedly fastened to said transmission tube;

a clutch fixedly mounted on said transmission tube and coupled to said first transmission gear;

an idle gear wheel, said idle gear wheel having a first series of teeth meshed with said first transmission gear and a second series of teeth meshed with said second transmission gear;

a driven gear coupled to said first transmission gear;

a drive gear fixedly mounted on the output shaft of the engine of the remote control toy car and meshed with the driven gear of said dual-gearshift position transmission mechanism;

a forward backward transmission control mechanism, said forward backward transmission control mechanism comprising:

a first gear fixedly mounted on the transmission tube of said dual-gearshift position transmission mechanism, said first gear comprising external teeth arranged around the outer diameter thereof and internal teeth arranged around the inner diameter thereof;

a second gear, said second gear comprising internal teeth arranged around the inner diameter thereof and external teeth arranged around the outer diameter thereof;

a movable gear adapted to be moved between a first position where said movable gear is meshed with the internal teeth of said first gear, and a second position where said movable gear is meshed with the internal teeth of said second gear;

a first idle gear wheel meshed with the external teeth of said first gear; and a second idle gear wheel meshed with said first idle gear wheel and the external teeth of said second gear; and a differential assembly, said differential assembly comprising:

a shell;

a hollow polygonal shaft mounted in said shell and inserted through said movable gear of said forward backward transmission control mechanism for enabling said movable gear to be moved axially along said polygonal shaft;

a first center axle axially inserted through said hollow polygonal shaft and said transmission tube for free rotation relative to said hollow polygonal shaft and said transmission tube;

a first center axle gear fixedly mounted on said first center axle;

a second center axle axially coupled to said first center axle for enabling said second center axle and said first center axle to be separately rotated;

a second center axle gear fixedly mounted on said second center axle;

a plurality of first planet gears mounted in said shell and respectively meshed with said second center axle gear; and a plurality of second planet gears mounted in said shell and respectively meshed with said first center axle gear.

* * * * *